G. VON ARCO AND A. MEISSNER.
TRANSMITTING APPARATUS FOR WIRELESS TELEGRAPHY AND TELEPHONY.
APPLICATION FILED MAR. 23, 1917.

1,308,514.

Patented July 1, 1919.

Inventors:
Georg von Arco and
Alexander Meissner
By their Attorneys
Knight Bros.

UNITED STATES PATENT OFFICE.

GEORG VON ARCO AND ALEXANDER MEISSNER, OF BERLIN, GERMANY.

TRANSMITTING APPARATUS FOR WIRELESS TELEGRAPHY AND TELEPHONY.

1,308,514. Specification of Letters Patent. Patented July 1, 1919.

Original application filed March 6, 1914, Serial No. 822,901. Divided and this application filed March 23, 1917. Serial No. 156,894.

*To all whom it may concern:*

Be it known that we, GEORG VON ARCO and ALEXANDER MEISSNER, subjects of the German and Austrian Emperors, respectively, and both residing at Berlin, Germany, have invented certain new and useful Improvements in Transmitting Apparatus for Wireless Telegraphy and Telephony, of which the following is a full specification.

Our invention relates to an arrangement for producing high frequency currents by means of stationary frequency changers, principally for the purpose of wireless telegraphy and telephony.

High frequency oscillations which have been heretofore used in transmitting stations for wireless telegraphy and telephony, have been produced heretofore chiefly by means of sparks or electric arcs. For some time attempts have also been made to produce such high frequency oscillations directly in rotating generators, and the advantage which was expected was to generate more conveniently and economically the necessary large amount of energy for stations having very long ranges. The early experiments in this direction, however, have been unsuccessful, since it has not been possible to produce appreciable amounts of energy in the high frequency generators. So far as recent experimeters have succeeded in constructing high frequency generators yielding appreciable amounts of energy, it has been only with very expensive machines, and such machines have shown a number of technical disadvantages, the principal of which is that it is possible to vary the wave lengths within wide limits, as is necessary in most instances in transmitting stations, only by controlling the speed of the machine. This results, however, in a very uneconomical operation of the generator. Moreover, great difficulties have been encountered, in stations attempting to transmit a large amount of energy in such manner in controlling the high frequency currents for producing signals or speech, because it was necessary to influence directly and to interrupt the strong high frequency currents for this purpose.

The object of the present invention is a transmitting station for wireless telegraphy and telephony in which the high frequency currents are produced in a generator without the disadvantages aforementioned. According to our invention, an arrangement is used for increasing the frequency of an alternating current in which, by means of stationary transformers having auxiliary magnetizing means, the frequency is multiplied (as illustrated it is doubled) or, by using a number of such transformers in cascade, the frequency is doubled or multiplied several times.

Experiments have proven that it is possible to obtain an increase of frequency amounting to any desired multiple of the fundamental frequency by means of only one or at most a few sets of stationary transformers of the character aforementioned. These stationary transformers which, in reality, constitute inductive alternating current resistances acting as such only in one direction, will be referred to hereinafter as "frequency changers." It is possible, when properly arranging such frequency changers to obtain an economically operating station, if a fundamental frequency is chosen of the order of from 5000 to 15000 periods per second, and if for this purpose a high frequency generator is used of a special character. A high frequency machine such as is used in the present invention and which, so far as its use for wireless telegraphy is concerned, still furnishes a current of comparatively low frequency, can be built at considerably lower cost than a machine which generates a current of such frequencies as are being used in the antenna. In using the means to be described in the present application, all alternating current circuits should be very exactly tuned by means of capacities and inductances to the required periodicity, in order that the currents may be increased and the losses diminished. If this is done the required high frequencies may be produced at very good efficiency. It is also possible, by properly arranging the sets of transformers, to obtain a wide range of wave lengths without necessitating material changes in the speed of the generator.

A transmitting arrangement of this character has been fully described in our Patent No. 1,267,018, May 21, 1918, from which the present application has been divided. As has been also described in aforesaid application, the means by which the energy radiated from the antenna can be controlled is very closely related to the function of the frequency changers. According to the aforesaid application, the high frequency currents are controlled by means of the auxiliary magnetization of the frequency changers by which large amounts of energy can be controlled in the easiest and simplest manner.

The arrangements by which it is possible to operate economically a transmitting station for wireless telegraphy and telephony as above outlined and to permit the use of the largest possible range of wave lengths, have been described in our co-pending application, Serial No. 738,864, filed Dec. 27, 1912. The means for controlling the radiation of high frequency energy for the purpose of telegraphy and telephony have been shown, described and claimed in our Letters Patent No. 1,181,556, granted May 2, 1916 and in the above-mentioned Patent No. 1,267,018, from the application for which the present application is divided. Certain particular novel arrangements of the frequency changers have been described and claimed in the U. S. patent to Pichon and Meissner, No. 1,169,676 of January 25, 1916.

The present application refers in particular to dimensioning and arranging windings of high frequency changers. Also the present application relates to the connection and the manner of winding the several sets of such changers and their connection with the primary generator and to the manner in which the antenna is connected with these sets. The particular advantages which are obtained by the novel arrangements as described hereinafter and shown, are an increase in the amount of energy transmitted and a more convenient control of the several circuits.

The invention is illustrated in the accompanying drawings in which.

Figure 1:
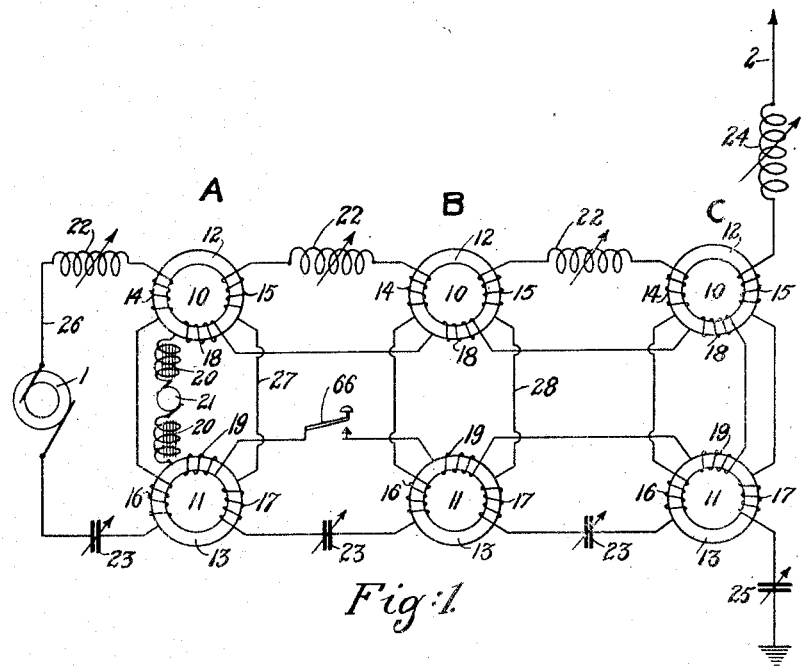
Figure 1 shows an arrangement for multiplying the frequency in several steps.

Referring now to Fig. 1, the arrangement shown therein is similar to that shown in Fig. 1 of the parent application and it is assumed also in this present case that the high frequency current of the generator 1 is multiplied in three places A, B, C, before it is supplied to the antenna 2.

As has been described in the parent application, these stationary frequency changers sets A, B, C, consist of a plurality of monoinductive alternating current resistances 10 and 11. Each of these elements 10 and 11 comprises a closed iron yoke 12 and 13 respectively, which is shown in the drawings as a ring and which is composed of thin layers of sheet iron insulated from each other, whereby each layer forms a closed magnetic path without joint. As has been described in aforesaid patent to Pichon and Meissner, the thickness of the sheets should decrease with increasing periodicity.

The iron yokes 10 and 11 carry windings 14, 15, 16, 17 which carry the high frequency currents. They are also provided with windings 18 and 19 which carry direct current for the auxiliary magnetization. The electrical effect of such a yoke is that of an induction coil constituting a mono-inductive alternating current resistance, because while the alternating current which may for example flow through coil 14 finds the iron of yoke 10 already saturated by the direct current coil 18 in one direction and therefore has to overcome only the self-induction of its own coil 14, this alternating current when flowing in the opposite direction will de-magnetize the iron and thus produce a strong counter-electromotive force in the coil.

By such varying magnetization of the iron by the alternating current high frequency potentials are produced in the auxiliary magnetizing windings 18 and 19, which must be prevented from reaching the direct current source 21. This is accomplished by means of choking coils 20. These choking coils are best constructed with open cores so that the direct current cannot saturate the cores which will prevent them from likewise acting, to a certain extent, as mono-inductive alternating current resistances.

Figure 2:
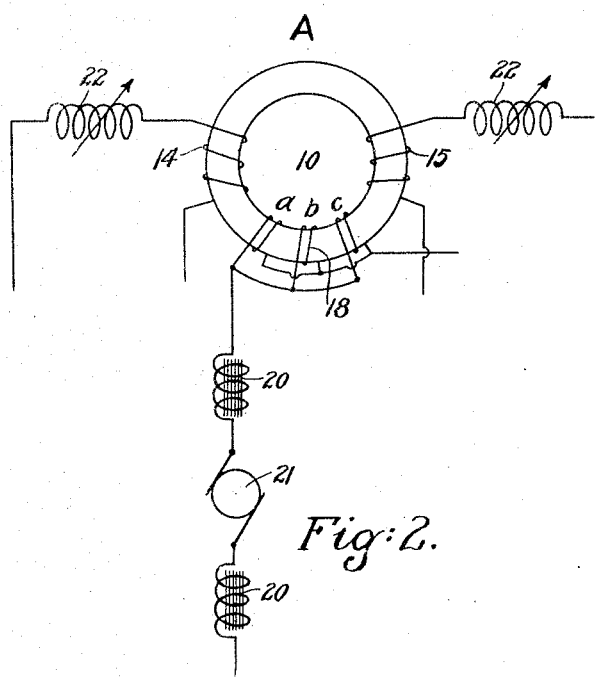
Fig. 2 shows a novel way of arranging the auxiliary magnetizing windings on the individual elements of the frequency changers.

In order to maintain the potential induced in the windings 18 and 19 as small as possible, it is advisable, particularly in case of large amounts of energy, to divide the windings of these coils into groups and to supply these groups in parallel. In such case, as source of direct current 21 which supplies the auxiliary magnetizing current, a low voltage generator is used to the best advantage. This arrangement is shown in Fig. 2 for the yoke 10 of the set A of the frequency changers, the coil 18 consisting of three groups a, b, c arranged in parallel. The same sub-division may be used for the coils 18 and 19 in the other sets.

The efficiency of coils is the higher the smaller the magnetic stray flux and the smaller the losses in the iron and in the copper. The core must therefore be suitably shaped and all windings should be as nearly as practicable uniformly distributed over the entire length. In case large amounts of energy are involved, it is of advantage to construct the core of a number of packs of sheet metal insulated from each other so that air spaces remain between the packs, and it is also of advantage to arrange the windings so that between the individual layers and turns, ample air space remains. The entire apparatus is best submerged in oil, which then can circulate between the windings and the iron packs, as has been clearly shown in the forementioned Patent, No. 1,169,676 to Pichon and Meissner.

The best results with regard to the multiplication of the frequency are obtained in this apparatus if the effective ampere turns of the high frequency current approximately equal those of the direct current, the former should not be more than 20% larger than the latter. When such proportioning of the windings is used, the energy transmission from the primary to the secondary side of the changers becomes a maximum.

The frequency changers for the purposes referred to hereinbefore may be connected according to the manner in which the energy is desired to be transmitted from one step to the next one; a number of examples of such connection has been given in the co-pending applications above referred to. The simplest given is that in which each changer set is provided with two primary alternating current windings 14 and 16 and two secondary alternating current windings 15 and 17. In this case the energy through the one-sided action of the changers is transferred from the primary to the secondary winding. In this case the frequency is doubled in the secondary circuit, if in two such mono-inductive resistances 10 and 11 for each step the primary and secondary phases are correctly placed in cascade as is shown in Fig. 1 for the steps A, B, C. If in this case, for instance, the primary windings 14 and 16 of a changer set are wound upon their respective cores 12 and 13 in the same sense and their magnetizing effect is in the same direction, whereas the effect of the auxiliary magnetizing windings 18 and 19 upon their respective cores is in the opposite sense relative to each other, then the secondary windings 15 and 17 must be wound upon their respective cores in opposite sense relative to each other.

22, 24 and 23, 25 respectively are self-induction coils and condensers which serve as tuning elements for the circuits 26, 27, 28 and for the antenna circuit so as to tune the respective circuits to the desired frequencies, whereby the efficiency of the arrangement is increased.

Figure 3:
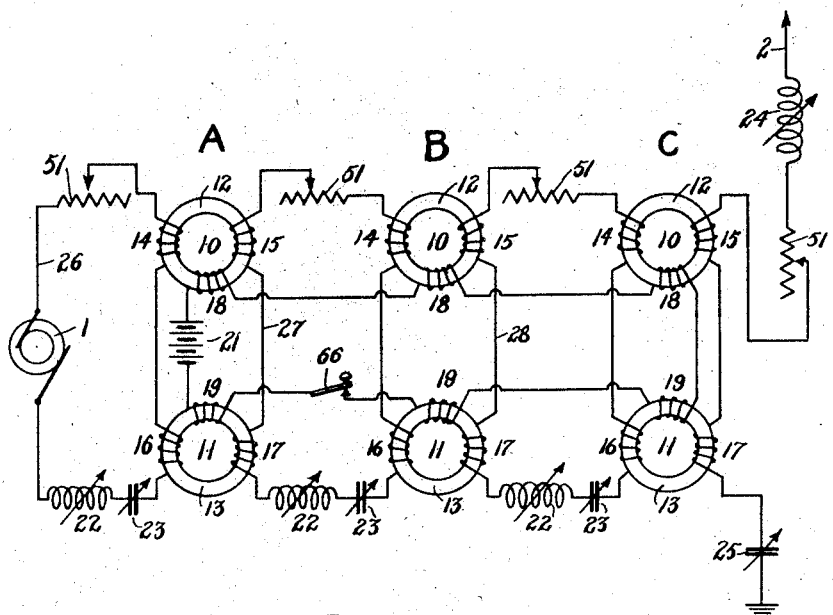
Fig. 3 shows the arrangement of ohmic resistance in the several circuits into which the frequency changer sets are connected to facilitate tuning.

It has been proven by practical experience that it is quite time consuming and that it requires great skill to tune the individual circuits exactly by the above means to the desired frequencies. The reasons for the difficulty are that the range within which resonance occurs is very limited, and that all circuits owing to the iron core transformers or through choking coils, are closely coupled together and therefore every disturbance in the tuning is transmitted to the other circuits, whereby these disturbances manifest themselves more strongly the farther the point in the circuit from the point of resonance. In order to facilitate the tuning, according to the present invention, adjustable ohmic resistances 51, (Fig. 3) are provided in the several circuits and also in the antenna circuit, which are at the beginning of the tuning operation thrown in at their full value and which are gradually removed as the point of resonance is approached. Therefore so long as the damping of the circuits is increased by the entire resistance being in circuit, it is comparatively easy to tune roughly and to tune closer as the resistances are decreased.

The use of very closely tuned circuits for multiplying the frequency, has the disadvantage that at every change of frequency caused by unintentional variations in the generator speed these circuits must be newly tuned, which of course requires time and great care. In practice frequently a quick change in wave length is desirable. Such change may be obtained according to the present invention by rendering the arrangement independent of the sharp tuning of the intermediate circuits which connect the changer sets. For this purpose we may make the damping of the intermediate circuits so large that these circuits become nearly aperiodic.

Figure 4:
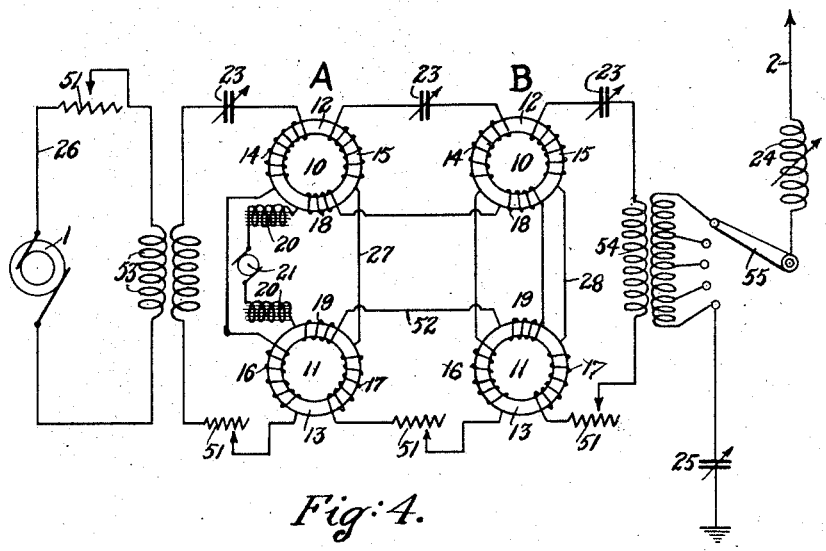
Fig. 4 shows an arrangement having strongly damped intermediate circuits between two changer sets in order to avoid the necessity of such sharp tuning of intermediate circuits.

A circuit arrangement by which this may be accomplished is shown in Fig. 4. In this figure only two changer sets A and B are shown which are connected by the intermediate circuit 27 and the auxiliary magnetizing circuit 52, like the sets A and B in the other figures. The current generated in the machine 1 is supplied to the first set A by means of the transformer 53. Likewise the antenna 2 is inductively connected to the last changer set through a transformer 54, the primary coil of which is located in the secondary circuit of set B.

The desired damping may be obtained by leaving the resistances 51 permanently and substantially to their full value in the circuits in which they are located.

In order to increase still further the damping of the circuits 26, 27 and 28 to such an extent that they become substantially aperiodic, it is advisable to use additional means besides the resistances 51. It is advisable to make the number of turns on the frequency changer windings as large as possible, so that in that case they will act as ordinary voltage transformers which carry the energy to be transformed at high potential and small current volume, in which case the conductive resistance, which partly determines the damping, becomes comparatively large. Therefore it becomes necessary to dimension the coils with respect to their ampere turns as described before, so that the transmission of the energy through the frequency changers becomes a maximum. If the capacity also is made very large, compared with the total self-induction of the individual oscillating circuits, very strong damping of the circuits is obtained. Owing to this strong damping it becomes possible to vary the frequency of the currents which are transformed by these circuits within wide limits without materially affecting the efficiency of the energy transmission.

The means above described can be used for producing a continuous scale of waves in a wireless transmitting station by making the fundamental frequency variable, that is to say by varying the speed of the generator 1. The range in which these gradual variations of the frequency occur may be chosen so that it fills in the gap between two consecutive frequency changer steps. This has been clearly described and shown in our co-pending application, Serial No. 738,864 referred to hereinbefore.

It is of course not necessary to make the circuits entirely aperiodic. It is sufficient to increase the damping to such an extent that the resonance curve of the circuits becomes sufficiently flat at the top to prevent, within the range of variation of the fundamental frequency, the decrease of the current amplitude beyond the admissible limits. Therefore it will probably be necessary in most cases to make the condensers 23 variable, aside from varying the resistances 51. By this combination, the adjustment of the circuits is greatly facilitated.

In using the transformer 53 between the generator and the first changer set, as shown in Fig. 4, the advantage is obtained that the circuit which contains the high frequency generator can be made aperiodic to the desired degree. The transformer 54 which connects the secondary side of the set B with the antenna, again transforms the energy derived from the set B into values of potential and current suitable for the antenna circuit. For this purpose it is also advisable to make the ratio of transformation of transformer 54 variable, for instance by means of the selective switch 55.

We claim:

1. An arrangement for increasing the frequency of alternating currents by means of stationary frequency changers, having a plurality of mono-inductive alternating current resistances, comprising a closed iron core carrying primary and secondary alternating current windings and an auxiliary magnetizing winding and means for supplying current to said magnetizing windings, the effective number of ampere turns of the primary alternating current winding being substantially equal to the number of ampere turns of the auxiliary magnetizing winding.

2. An arrangement for increasing the frequency of alternating currents comprising an alternating current generator, a plurality of sets of frequency changers for multiplying the frequency of said generator, said changers consisting of mono-inductive alternating current resistances having primary and secondary alternating current windings and an auxiliary magnetizing winding, all of said windings being arranged in each changer upon a closed iron core, and a working circuit to which the energy is supplied from said frequency changers; said generator and frequency changers and working circuit being connected by oscillation circuits, each circuit being tuned to the frequency imposed upon it by the frequency changer and the generator, and variable ohmic resistances in said circuits adapted to be gradually short circuited as these circuits approach the point of resonance during the tuning operation for the purpose of facilitating said tuning.

3. An arrangement for multiplying the frequency of alternating currents comprising an alternating current generator, a plurality of sets of frequency changers for multiplying the generator frequency, each set comprising mono-inductive alternating current resistances, having closed iron cores and primary and secondary alternating current windings and an auxiliary magnetizing winding mounted thereon, and a working circuit receiving the energy from said frequency changers; said generator and frequency changers and working circuit being connected by oscillation circuits and means for rendering said circuits approximately aperiodic to render transmission of energy from the generator to the working circuit as independent as possible from the variations in speed of the generator.

4. An arrangement for multiplying the frequency of alternating currents, comprising an alternating current generator, a plurality of sets of frequency changers for multiplying the generator frequency, each set consisting of a plurality of mono-inductive resistances, each comprising a closed iron core, carrying primary and secondary alternating windings and an auxiliary magnetizing winding, and a working circuit receiving the energy from said frequency changer sets; said generator and frequency changers and working circuit being connected by oscillation circuits containing ohmic resistances to render said circuits substantially aperiodic to render the transmission of energy from the generator to working circuit as independent as possible from the speed variations of said generator.

5. An arrangement for multiplying the frequency of alternating currents, comprising an alternating current generator, a plurality of sets of frequency changers in cascade relation for multiplying the generator frequency, said sets each consisting of a plurality of mono-inductive alternating current resistances, each comprising a closed iron core carrying primary alternating current windings of many turns and secondary alternating current windings of many turns and an auxiliary magnetizing winding, and a working circuit for receiving the energy from said frequency changer sets; said generator and frequency changer sets and working circuit being connected by oscillation circuits including said primary and secondary windings, whereby the damping of said circuits is rendered so high that the transmission of energy from the generator to the working circuit is substantially independent of the variations of the generator speed.

6. An arrangement for multiplying the frequency of alternating currents comprising an alternating current generator, a plurality of sets of frequency changers for multiplying the generator frequency, each set consisting of a plurality of mono-inductive alternating current resistances comprising a closed iron yoke carrying primary and secondary alternating current windings and an auxiliary magnetizing winding, and a working circuit receiving the energy from said frequency changers; said generator, said changer sets and said working circuit being connected by oscillation circuits, the effective number of ampere turns on the primary alternating current windings of said mono-inductive resistances being substantially equal to the number of ampere turns of the auxiliary magnetizing winding on said resistances for the purpose of increasing the damping of said circuits.

7. An arrangement for multiplying the frequency of alternating currents comprising an alternating current generator, a plurality of sets of frequency changers for multiplying the generator frequency, each set consisting of a plurality of mono-inductive alternating current resistances, each comprising a closed iron core carrying primary and secondary alternating current windings and an auxiliary magnetizing winding, and a working circuit for receiving the energy from said frequency changers; said generator, said changers and said working circuit being connected by oscillation circuits, said circuits containing large capacities and low total inductances to render said circuits substantially aperiodic.

8. An arrangement for multiplying the frequency of alternating currents comprising an alternating current generator, a plurality of sets of frequency changers for multiplying the frequency of the generator, each set consisting of mono-inductive alternating current resistances, each comprising a closed iron core carrying primary and secondary alternating current windings and an auxiliary magnetizing winding, and a working circuit for receiving the energy from said frequency changers; said generator, said changers and said working circuit being connected by oscillation circuits, means for rendering these circuits substantially aperiodic to render transmission of energy from the generator to the working circuit as independent as possible from variations of the generator speed and a current transformer between the generator and said frequency changers.

9. An arrangement for multiplying the frequency of alternating current comprising an alternating current generator, a plurality of sets of frequency changers for multiplying the generator frequency, each set consisting of mono-inductive alternating current resistances, each comprising a closed iron core carrying primary and secondary alternating current windings and an auxiliary magnetizing winding and a working circuit for receiving the energy from said frequency changers; said generator, said changers, and said working circuit being connected by oscillation circuits, means for rendering said oscillation circuits approximately aperiodic to render the transmission of energy from the generator to the working circuit substantially independent of the variations in generator speed and a transformer having means for varying its ratio and being interposed between the last changer set and the working circuit to deliver the energy from the said last set to the working circuit in the proper form of potential and current desired for the working circuit.

GEORG von ARCO.
ALEXANDER MEISSNER.

Witnesses:
HENRY HASPER,
ALLEN F. JENNINGS.